United States Patent

[11] 3,561,342

| [72] | Inventor | Franz W. R. Starp<br>Calmbach, Black Forest, Germany |
|---|---|---|
| [21] | Appl. No. | 714,186 |
| [22] | Filed | Mar. 19, 1968 |
| [45] | Patented | Feb. 9, 1971 |
| [73] | Assignee | Prontor-Werk Alfred Gauthier G.m.b.H.<br>Calmbach, Black Forest, Germany<br>a corporation of Germany |
| [32] | Priority | Mar. 23, 1967 |
| [33] | | Germany |
| [31] | | P41718 |

[54] EXPOSURE TIME CONTROL INSTRUMENT FOR PHOTOGRAPHIC CAMERAS
11 Claims, 7 Drawing Figs.

[52] U.S. Cl. ......................................................... 95/53
[51] Int. Cl. ........................................................ G03b 9/00
[50] Field of Search........................................... 95/53, 10C, 64

[56] References Cited
UNITED STATES PATENTS

| 3,165,989 | 1/1965 | Kiper | 95/10C |
|---|---|---|---|
| 3,187,653 | 6/1965 | Rentschler | 95/53 |
| 3,407,716 | 10/1968 | Wick et al. | 95/10C |
| 3,418,904 | 12/1968 | Wick et al. | 95/53 |
| 3,433,140 | 3/1969 | Wick et al. | 95/10 |

Primary Examiner—John M. Horan
Assistant Examiner—D. J. Clement
Attorney—March, Gillette & Wyatt ABSTRACT: An exposure time control instrument attachable to the wire release connection of a photographic camera equipped with a "B" setting; the control instrument has a plunger for the release of the camera and an electronic timing device which can depend upon lighting conditions and can be regulated manually to obtain exposure times of different duration when the camera is set to "B". The plunger acting upon the camera is of a two-part design, one of the plunger parts being manually operable and the other of the plunger parts being cooperative with the release mechanism of the camera shutter. An electromagnetic coupling device is disposed between the two plunger parts and transfers the releasing pressure from the manually operable plunger to the other plunger part. The electromagnetic coupling device is connected to the electronic timing device for triggering by control impulse and to enable the other plunger part to return instantaneously after the release of the camera shutter.

INVENTOR
Franz W. R. Starp
BY
March, Gillette & Wyatt
ATTORNEY.

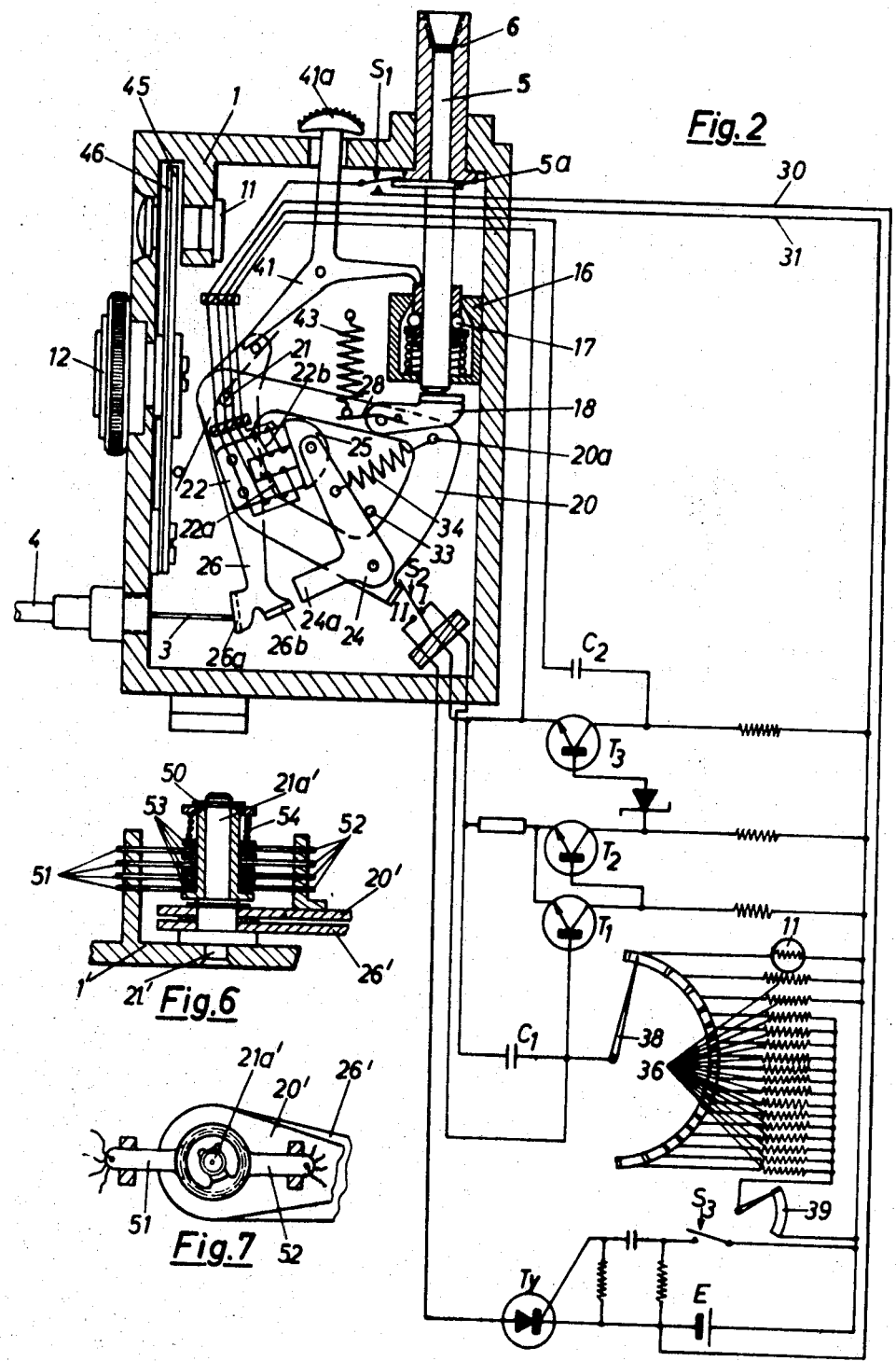

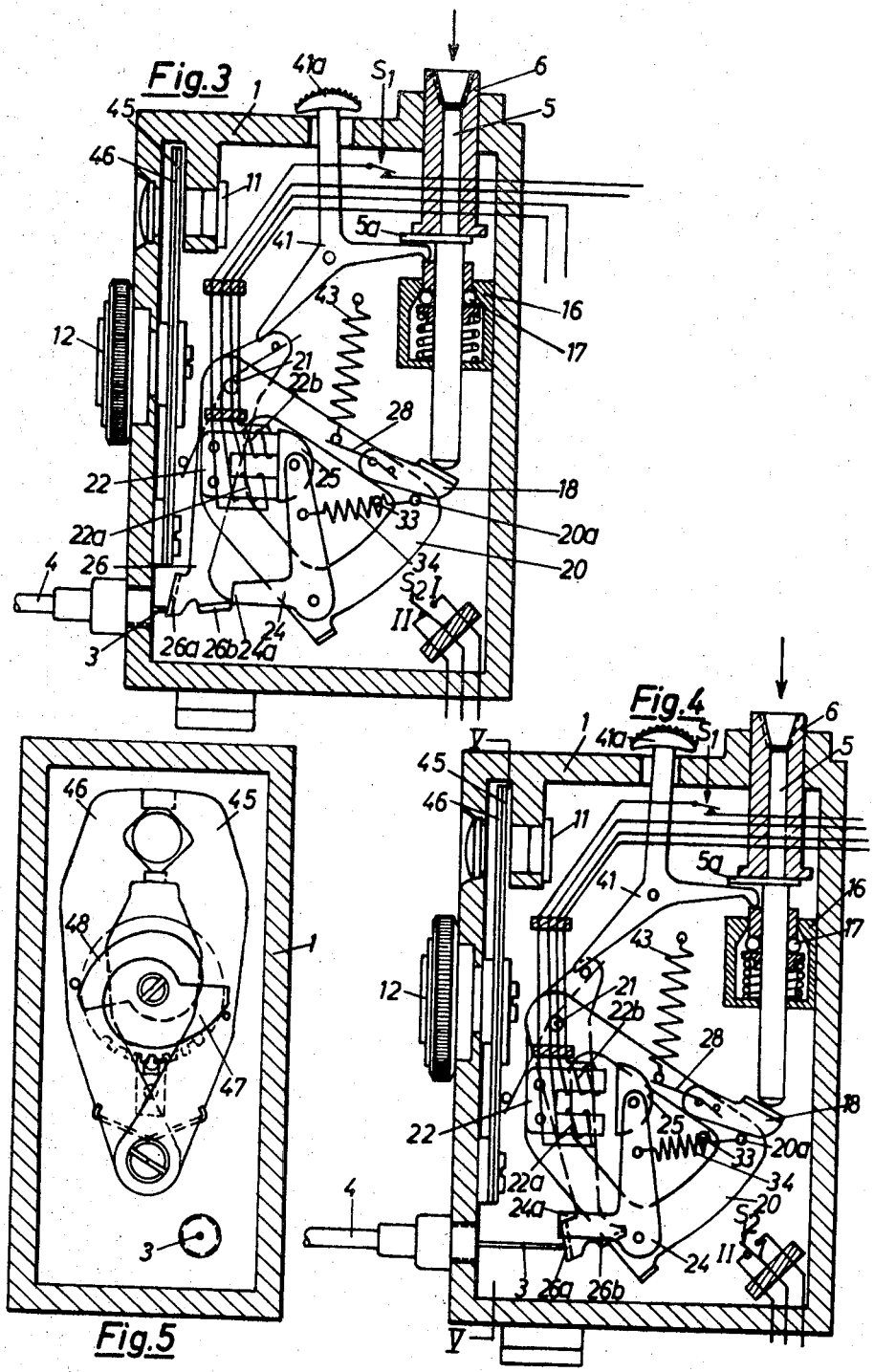

EXPOSURE TIME CONTROL INSTRUMENT FOR PHOTOGRAPHIC CAMERAS

This invention relates to an exposure time control instrument which can be attached to the wire release connection of a photographic camera equipped with "B" setting and which has a plunger for the release of the camera as well as an electronic timing device responsive to lighting conditions and/or settable manually, to obtain exposure times of differing duration when the camera is set on "B."

In one of the known instruments of the category described at the above, the release plunger acting upon the camera is of one-piece design. This means that the closing process of the shutter is dependent on the return motion of the release plunger because, as is known, the shutter remains open for the duration of the pressure on the release plunger when the camera is set to "B." Therefore, the shortest exposure time achievable with such an instrument is given by the photographer's reaction time for the removal of his finger from the depressed release plunger, so that this instrument is suited, per se, merely for the electronic control of exposure times longer than approximately 1 second.

It is an object of this invention to provide an instrument of the type described at the outset at a relatively small structural expense that assures reliable functioning, so that with it, in conjunction with the camera shutter, instantaneous exposure times are achievable in addition to ultralong exposure times.

It has now been found that the foregoing and related objects can be readily attained in an exposure time control instrument having a plunger acting upon the camera that is of two-piece design and wherein there is disposed between the two plunger parts an electromagnetic coupling device which transfers the release pressure from one to the other of the plunger parts and can be triggered by a control impulse of the electronic timing device and which enables the plunger part cooperating with the release mechanism of the camera shutter to return instantly after the latter's release. The advantage of such an exposure time control instrument is that it is no longer restricted exclusively to being used when taking pictures requiring relatively long exposures, but can be applied wherever the point is to control the exposure time of a camera by means of an accessory instrument attachable thereto. This advantage has beneficial effects not only from a handling point of view, but also from an economic one, because the instrument can be manufactured in larger quantities and can, therefore, be supplied less expensively.

A coupling device, distinguished by relatively few parts used for its construction and by relatively little assembly space required for it, can be realized by providing a supporting plate, movable with the finger-loaded plunger part against the returning force of a spring, as well as a coupling pawl which is disposed on the supporting plate. This coupling pawl is also under the influence of a spring and cooperates with the plunger part cooperating with the release mechanism of the camera and in addition carries a magnetic armature located within the range of attraction of a magnet fastened on the supporting plate. For the purpose of assuring reliable performance, it is further provided in an advantageous development of the invention for the supporting plate to be of leverlike design and rotatably mounted at one end on a fixed pin. The coupling pawl, likewise rotatably mounted on the supporting plate, is designed as two-armed lever, one lever arm of which carries the armature cooperating with the magnet while its other lever arm cooperates with the plunger part cooperating with the release mechanism of the camera.

In order to obtain in simple manner the preconditions for a proper sequence in the actuation of the various contact switches of the electronic timing device when using an electromagnet, the arrangement is such that the finger-loaded plunger part acts upon the leverlike supporting plate by means of a spring loaded actuating pawl disposed on the supporting plate.

The invention also provides for a control instrument wherein the finger-loaded plunger part can be locked in the release position by means of a detent, such as a ball arrestment. In this embodiment, the automatic unlocking of the detent can be effected simultaneously with the return of the plunger part cooperating with the wire release of the camera. To accomplish this there is interposed, between the plunger part cooperating with the release mechanism of the camera and the coupling pawl, a lever mounted coaxially with the leverlike supporting plate and in positive connection with the ball arrestment via another pivotally mounted positioning lever.

Bending stresses which, in time, may lead to a fracture of the electrical leads to the movable magnet can be avoided if the pivot pin serving as mounting for the supporting plate has an extension on which are disposed contact plates for the flexible connection of the electrical lines leading from the electronic timing device to the magnet.

Other objects and advantages will be readily apparent from the following detailed specification and claims and the drawings appended hereto wherein:

FIG. 1 is a perspective view of the exposure time control instrument of this invention, fastened in the viewfinder shoe of a camera, mechanically connected to the wire release connection on the camera side and electrically connected to the flash contact connection fitting, FIG. 2 is an enlarged longitudinal cross-sectional view through the control instrument of FIG. 1 in the initial position with the electronic timing device illustrated diagrammatically.

FIG. 3 is a view similar to FIG. 2 without the wiring diagram and with the instrument illustrated in the position which causes the release of the camera, FIG. 4 is a view similar to FIG. 3, wherein the release plunger is pressure loaded and the coupling device has already released for the return of the plunger part cooperating with the wire release of the camera.

FIG. 5 is a cross section view of the instrument along line V—V of FIG. 4.

FIG. 6 is an enlarged cross-sectional view of a device providing for the flexible connection of the electrical lead wires to the movably mounted magnet.

FIG. 7 is a top view of the device of FIG. 6.

Figure 1:
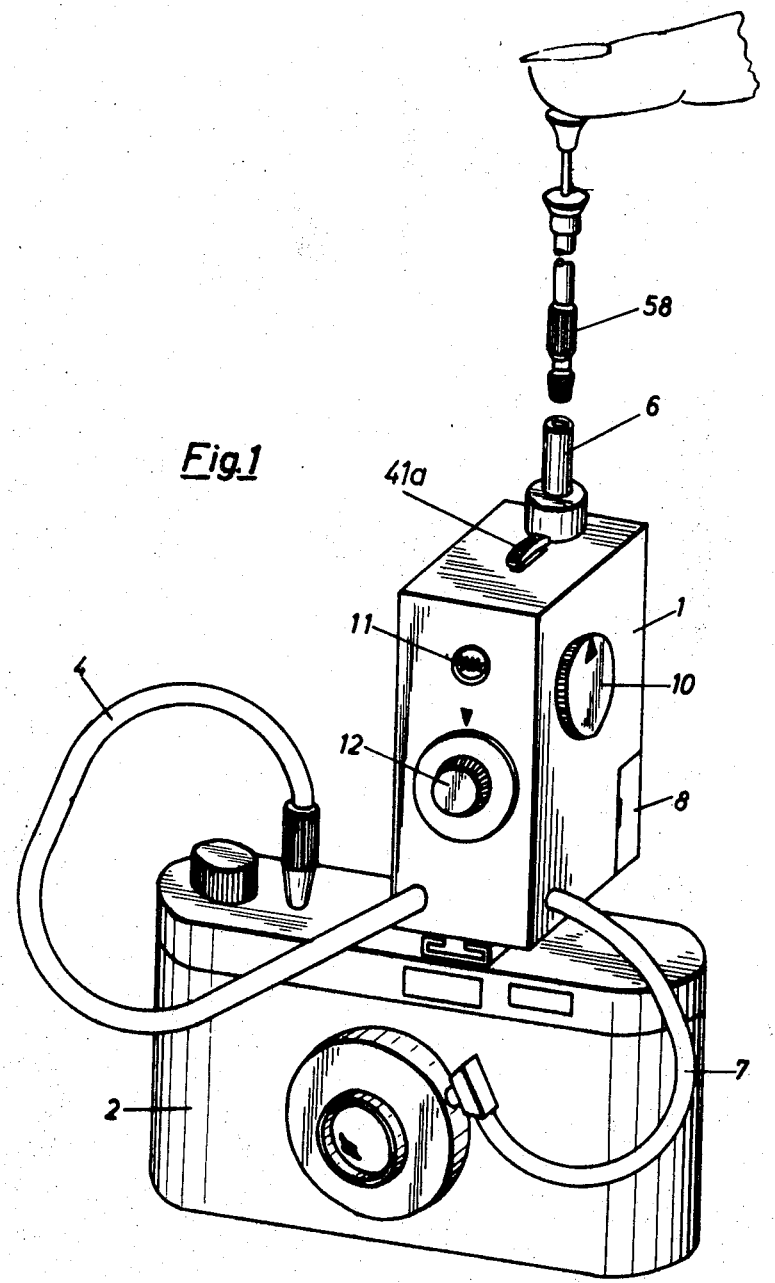

Referring now to the drawings, there is illustrated in FIG. 1, a housing, designated by the reference numeral 1, of the exposure time control instrument serving the electronic control of exposure times in a camera with an otherwise purely mechanically controlled shutter. The housing 1 is held in the viewfinder shoe of a camera 2 by means of a plug-in foot. To release the camera, the instrument is provided with a two-part release plunger having one part formed by a pushpin 3 which is a component of a cable 4 which can be screwed into the wire release connection on the camera side and which acts upon the release mechanism of the shutter in the usual manner. The other part of the release plunger, to be loaded by finger pressure, is a pushpin 5, received by a release knob 6 and moveably guided by the latter in the housing 1. An electronic timing device, accommodated in the housing 1 of the instrument, is connected to the flash contact connection fixture on the camera side via an electric cable 7 for the achievement of an effect to be explained further below. A flap 8 closes the space for the accommodation of a battery for the electronic timing device. A turning knob 10, serving to influence the electronic timing device in a manner to be later described, can be set either into an "Auto" setting or to a "Manual" setting range whereby, in the former case, the exposure time is regulated automatically depending on lighting conditions by using a photoresistor, and in the latter case the exposure time is presettable by hand within the "Manual" range. For the consideration of exposure factors such as stop and film sensitivity when the instrument is set to "Auto," the photoresistor 11 is preceded by shading means influenceable by a setting knob 12.

As may be seen from FIGS. 2 to 4, there is guided in the release knob 6 absorbing the finger pressure, the pushpin 5 whose initial position is fixed by a collar 5a. Furthermore, the pushpin 5 is guided in a stationary bushing 16 equipped with internal cone, which bushing is a component of a ball lock 17 cooperating with the pushpin 5. The free end of the pin 5 pushes against an actuating pawl 18 which, in turn, is linked to a leverlike supporting plate 20 mounted on a stationary pivot pin 21. The plate 20 further carries a magnet 22 which is influenceable by the electronic timing device and which may be designed as an electromagnet, having two windings 22a and 22b. In addition, there is mounted on the supporting plate 20 a coupling pawl 24 with a magnet armature 25. There may also be disposed coaxially to the supporting plate 20 a dual-armed lever 26 which is provided with two tabs 26a and 26b, of which the former acts upon the pin 3 of the release plunger which faces the camera, whereas the second tab makes contact with the face of an arm 24a of the coupling pawl 24 during the releasing process.

When the plunger 5, guided in the release knob 6, is depressed for the purpose of taking a picture, it acts upon the actuating pawl 18 which contacts the pin 20a of supporting plate 20, against the force of the spring 28. This stroke suffices to close a switch $S_1$ which has been kept open in the initial position of the plunger part 5 by the collar 5a. Closing of the switch $S_1$ connects, via lines 30 and 31, the winding 22a of the magnet 22 to the power source E of the electronic timing device. The magnetic field formed holds the armature 25 and, with it, the coupling pawl 24. Upon continued pressure on the plunger part 5, the plate 20 turns clockwise and with it the magnet 22 and the coupling pawl 24 also turn whereby the pawl 24 loses its firm support against the stationary pin 33. However, the coupling pawl 24 cannot yield to the force of an extension spring 34 because the magnet 22 exerts a stronger holding force. Upon further motion, the arm 24a of the coupling pawl 24 engages the tab 26b of the lever 26 which in turn rotates around the pin 21, and its tab 26a transfers the motion to plunger part 3 so that the camera, set to "B," is finally released as illustrated in FIG. 3.

With the a start of the pivoting motion of the supporting plate 20, a reversing switch $S_2$ assigned to the electronic timing device shifts from the contact making position 1 into position II. This action cancels out the short circuit via the capacitor $C_1$, and the circuit of the electronic timing device is closed. However, no current is yet sent through because the thyristor $T_y$, disposed in the feed line of the electronic timing device, whose grid is electrically connected to the flash contact $S_3$ via cable 7 plugged into the flash contact connection fixture on the camera side, remains blocked, thus interrupting the current flow to the electronic timing device, as long as the flash contact on the camera side is open. Due to the arrangement of the thyristor $T_y$, ignitable via the flash contact $S_3$, the reference point governing the time formation is the same in any camera, i.e. independent of the nature of the release mechanism.

If finally, in the course of the releasing motion described above, the shutter has been triggered to run off, the latter opens and, in the "B" setting, remains in the open position as long as the plunger part 3 assigned to the camera remains under pressure. With the opening of the shutter, the flash contact $S_3$ is closed and, as a consequence hereof, the thyristor $T_y$ is ignited. This causes current to flow through the electronic timing device which is composed of the two transistors $T_1$ and $T_2$ and designed as a trigger circuit, whereby the transistor $T_2$ is activated first, whereas the transistor $T_1$ as well as the additional transistor $T_3$ are blocked. This enables the capacitor $C_2$ in the circuit of the coil 22b of the electromagnet 22 to charge. At the same time, the capacitor $C_1$, governing the time formation, also charges, either via the photoresistor 11 in accordance with the prevailing lighting conditions, or via one of the resistors 36, which can be included in the circuit, depending on the exposure time desired. Including one of the aforementioned resistors 11 or 36 into the circuit of the electronic timing device is accomplished by means of a slider 38 corotating with the turning knob 10, whereby the photoresistor 11 is included in the circuit in the "Auto" setting of this turning knob and one of the fixed resistors is included within the "Manual" range. An infinitely variable resistor 39 may be provided in addition if importance is attached to fine adjustment of the exposure time.

After a certain time interval the electronic circuit arrangement reverses and the transistor $T_1$ becomes current-carrying, whereas transistor $T_2$ becomes blocked. This causes a positive potential at the base of the transistor $T_3$ so that it also becomes active. Consequently the capacitor $C_2$ can discharge via the transistor $T_3$ and the coil 22b, whereby the magnetic field built up by the coil 22a and holding the coupling pawl 24 is erased. This enables the spring 34 to become effective and turn the coupling pawl 24 clockwise. This causes the lever 26 to lose its support against the pawl 24, enabling the plunger part acting upon the camera to return instantaneously, as shown in FIG. 4. With this return motion of the plunger part 3, permitted by the coupling device, the shutter changes from the open to the closed position independent of the pressure load on the plunger part 5.

On the return of the lever 26, one of its arms strikes a rotatably mounted positioning lever 41 and pivots it clockwise. The latter thereby unlocks the ball detent 17. In order to be able to unlock the ball detent 17 independent of the electronic timing device, the positioning lever 41 is provided with a pushbutton 41a for manual actuation. If there is no finger pressure on the plunger part 5, the supporting plate 20, including the parts 22 and 24 mounted thereon can return into the initial position illustrated in FIG. 2 under the influence of a spring 43. The coupling pawl 24 thereby strikes against the stationary pin 33 so that the armature 25 can again make contact with magnet 22. Simultaneously with the return of the aforementioned parts into the initial position, the switch $S_2$ is reversed and the contact switch $S_1$ is opened.

In the representation according to FIG. 2, the photoresistor 11 is shown not only symbolically in the wiring diagram, but in addition also physically, assembled in housing 1. For the consideration of the exposure factors stop and film sensitivity when the exposure time is set automatically, the photoresistor 11 may be preceded by shading means which, as may be seen from FIG. 5, may be composed of the rotatably mounted laminations 45 and 46. To actuate them, the positioning knob 12 corotates with the two cams 47 and 48, each acting upon one lamination.

In the example of a coupling device as described above, between the two plunger parts 3 and 5, the magnet 22 is disposed on the pivoted supporting plate 20, which means that the electric wires leading away from the magnet would be subjected to a constant bending stress. To prevent the danger of the lead wires breaking, a device can be provided according to FIGS. 6 and 7 which interconnects the lead wires electrically at the pivot point of the supporting plate by means of parts flexibly coordinated with each other. For this purpose, there may be put over an extension 21a' of the pivot pin 21' for the two parts 20' and 26' an insulating sleeve 50 on which, in the sequence shown in FIG. 6, the stationary contact plates 51 electrically connected with the circuit of the electronic timing device and the contact plates 52 which move with the supporting plate 20' are stacked with the insulating washers 53 interposed. The plates 51 and 52 can be kept in mutual contact making attitude by means of a spring 54.

As illustrated in FIG. 1, the actuation of the exposure time control instrument can, in case of need, also be effected by means of a flexible wire release 58 screwed into the release knob 6.

It will be understood that the foregoing description with the details of exemplary structure is not to be construed in any way to limit the invention, but that modifications may be made thereto without departing from the scope of the invention as set forth in the following claims.

I claim:

1. An exposure time control instrument attachable to the release mechanism connection of a photographic camera equipped with a "B" setting, said control instrument having a plunger for the release of the camera and electronic timing means which can depend on lighting conditions and can be regulated manually to obtain exposure times of different duration when the camera is set to "B," said plunger acting upon the camera being of two-part design, one of said plunger parts being manually operable and the other of said plunger parts being cooperative with the release mechanism of the camera shutter, an electromagnetic coupling means disposed between said two plunger parts and transferring the releasing pressure from said manually operable part to the other plunger part, said electromagnetic coupling means being connected to said electronic timing means for triggering by a control impulse and to enable said other plunger part cooperative with the release mechanism of the camera shutter to return instantaneously after the latter's release, and means for attaching said control instrument to the release mechanism of a photographic camera equipped with a "B" setting.

2. An exposure time control instrument attachable to the release mechanism connection of a photographic camera equipped with a "B" setting, said control instrument having a plunger for the release of the camera and an electronic timing device which can depend on lighting conditions and can be regulated manually to obtain exposure times of different duration when the camera is set to "B," said plunger acting upon the camera being of two-part design, one of said plunger parts being manually operable and the other of said plunger parts being cooperative with the release mechanism of the camera shutter, an electromagnetic coupling device disposed between said two plunger parts and transferring the releasing pressure from said manually operable part to the other plunger part, said electromagnetic coupling device being connected to said electronic timing device for triggering by a control impulse and to enable said other plunger part cooperative with the release mechanism of the camera shutter to return instantaneously after the latter's release 2. The exposure time control instrument of and wherein said coupling device has a supporting plate movable with said manually operable plunger part against the returning force of a spring; and a coupling pawl movably mounted on said supporting plate under the effect of a spring, said coupling pawl cooperating with said other plunger part and carrying a magnet armature located in the range of attraction of a magnet mounted on said supporting plate.

3. The exposure time control instrument of claim 2 wherein said supporting plate is designed as a lever and is pivoted at one end on a stationary pin and wherein said coupling pawl pivoted on said supporting plate is designed as dual-armed lever, one of said lever arms carrying said armature cooperating with said magnet and the other lever of said lever arms cooperating with said other plunger part cooperating with the release mechanism of the camera.

4. The exposure time control instrument of claim 3 wherein said manually operable plunger part acts upon said leverlike supporting plate by means of a spring-loaded actuating pawl disposed on said supporting plate.

5. The exposure time control instrument of claim 4 wherein said manually operable plunger part can be locked in the release position by means of a ball arrestment detent acting thereon and wherein another lever is interposed between said other plunger part and said coupling pawl, said another lever being mounted coaxially with said leverlike supporting plate and in positive connection with said detent by means of a positioning lever.

6. The exposure time control instrument of claim 3 wherein said pin mounting said supporting plate has an extension on which are disposed contact plates flexibly connecting the electric lines leading from said electronic timing device to said magnet.

7. An exposure time control instrument attachable to the wire release connection of a photographic camera equipped with a "B" setting, said control instrument comprising a housing, plunger means on said housing for the release of the camera and electronic timing means on said housing dependable on lighting conditions and regulatable manually to obtain exposure times of different duration when the camera is set to "B"; said plunger means acting upon the camera having a manually operable plunger part extending from outside said housing into the interior thereof and another plunger part operably connected to the wire release of the camera shutter, electromagnetic coupling means disposed between said two plunger parts and transferring the releasing pressure from said manually operable plunger part to said another plunger part, said electromagnetic coupling means being connected to said electronic timing means for triggering by a control impulse and to enable said another plunger part operatively connected to the wire release of the camera shutter to return instantaneously after the latter's release, said coupling means having a supporting plate movable with said manually operable plunger part against the returning force of a spring and a coupling pawl movably mounted on said supporting pa plate under the effect of a spring, said coupling pawl being operably connected with said another plunger part and carrying a magnet armature located in the range of attraction of a magnet mounted on said supporting plate.

8. The exposure time control instrument of claim 7 wherein said supporting plate is a lever and is pivoted at one end on a stationary pin and wherein said coupling pawl pivoted on said supporting plate is designed as a dual-armed lever, one of said lever arms carrying said armature cooperating with said magnet and the other lever of said lever arms being operably connected to said another plunger part cooperating with the wire release of the camera.

9. The exposure time control instrument of claim 8 wherein said manually operable plunger part acts upon said leverlike supporting plate by means of a spring-loaded actuating pawl disposed on said supporting plate.

10. The exposure time control instrument of claim 9 wherein said manually operable plunger part can be locked in the release position by means of a ball arrestment detent acting thereon and wherein another lever is interposed between said another plunger part and said coupling pawl, said another lever being mounted coaxially with said leverlike supporting plate and operably connected to said detent by means of a positioning lever.

11. The exposure time control instrument of claim 8 wherein said pin mounting said supporting plate has an extension on which are disposed contact plates flexibly connecting electric lines leading from said electronic timing means to said magnet.